US012771727B2

(12) United States Patent
Puhakainen et al.

(10) Patent No.: US 12,771,727 B2
(45) **Date of Patent: *Oct. 20, 2026**

(54) SECURITY SERVICE ORCHESTRATION FUNCTION BETWEEN COMMUNICATION SERVICE PROVIDERS

(71) Applicant: Telefonaktiebolaget LM Ericsson (publ), Stockholm (SE)

(72) Inventors: Anu Puhakainen, Espoo (FI); Harri Hakala, Turku (FI); Ari Pietikäinen, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 158 days.

This patent is subject to a terminal disclaimer.

(21) Appl. No.: 18/576,913

(22) PCT Filed: Jul. 7, 2021

(86) PCT No.: PCT/EP2021/068807

§ 371 (c)(1),
(2) Date: Jan. 5, 2024

(87) PCT Pub. No.: WO2023/280396

PCT Pub. Date: Jan. 12, 2023

(65) Prior Publication Data

US 2024/0314171 A1 Sep. 19, 2024

(51) Int. Cl.
*H04L 9/40* (2022.01)
*H04L 41/5006* (2022.01)
*H04L 41/5009* (2022.01)

(52) U.S. Cl.
CPC .......... *H04L 63/20* (2013.01); *H04L 41/5006* (2013.01); *H04L 41/5009* (2013.01)

(58) Field of Classification Search
None
See application file for complete search history.

(56) References Cited

U.S. PATENT DOCUMENTS

2007/0214208 A1* 9/2007 Balachandran ........ G06Q 10/10 709/201
2014/0108639 A1 4/2014 Nelke et al.
(Continued)

FOREIGN PATENT DOCUMENTS

WO 2017164784 A1 9/2017
WO 2023280397 A1 1/2023
WO 2023280398 A1 1/2023

OTHER PUBLICATIONS

Trapero, A novel approach to manage cloud security SLA incidents, 2017, Elsevier (Year: 2017).*
(Continued)

*Primary Examiner* — Fadi Haj Said
(74) *Attorney, Agent, or Firm* — Sage Patent Group

(57) ABSTRACT

A method implemented by a security service orchestration function (SSOF) in a communication infrastructure, that includes a plurality of communication service providers (CSPs), for orchestration of a security service level agreement (S-SLA) includes receiving a S-SLA request, by a CSP, from one or more other CSPs. Each S-SLA request includes a plurality of requirements. The method also includes converting each S-SLA request into a consistent and unified S-SLA offerable to each other CSP. The consistent and unified S-SLA includes security attributes that the CSP is capable of providing the other CSPs. The method also includes offering the consistent and unified S-SLA to each other CSP that submitted the S-SLA request. The method further includes receiving a response from each other CSP. The response from each other CSP includes an acknowledgement or a decline of the consistent and unified S-SLA including a non-repudiation signature of acknowledgement or declining.

20 Claims, 10 Drawing Sheets

(56) References Cited

U.S. PATENT DOCUMENTS

| | | | | |
|---|---|---|---|---|
| 2019/0149581 | A1* | 5/2019 | Silvestro | H04L 63/0428 726/1 |
| 2020/0169478 | A1 | 5/2020 | Joshi et al. | |
| 2020/0177460 | A1 | 6/2020 | Xu et al. | |
| 2021/0067419 | A1* | 3/2021 | Adam | H04L 41/0806 |
| 2021/0203570 | A9* | 7/2021 | Joshi | G06Q 30/0611 |

OTHER PUBLICATIONS

International Search Report and Written Opinion of the International Searching Authority, PCT/EP2021/068807, mailed May 3, 2022, 29 pages.
Trapero, Ruben et al., "A novel approach to manage cloud security SLA incidents," Future Generation Computer Systems, vol. 72, Jul. 1, 2017, 13 pages.
Jaatun, Martin Gilje et al., "Security SLAs—An Idea Whose Time Has Come?" (Aug. 20, 2012), Advances in Biometrics: International Conference, ICB 2007, Seoul, Korea, Aug. 27-29, 2007, Proceedings, 8 pages.
International Search Report and Written Opinion of the International Searching Authority, PCT/EP2021/068810, mailed Mar. 17, 2022, 14 pages.
Second Written Opinion of the International Preliminary Examining Authority for PCT/EP2021/068810, mailed May 16, 2023, 5 pages.
International Preliminary Report on Patentability of the International Preliminary Examining Authority for PCT/EP2021/068810, mailed Sep. 7, 2023, 24 pages.

* cited by examiner

SECURITY SERVICE ORCHESTRATION FUNCTION BETWEEN COMMUNICATION SERVICE PROVIDERS

TECHNICAL FIELD

The present disclosure relates generally to security orchestration and management communications, and more particularly to methods and devices for a security service orchestration function between communication service providers.

BACKGROUND

Security orchestration and management is left outside the scope in information technology systems, and they do not deal with security concerns related to the deployment, configuration, or continuous operations of the information technology. Secure orchestration and management of virtualization, general forms of security management, e.g., monitoring, are fundamental for computer systems to operate robustly. Since there are no specifications for security management and orchestration interfaces, vendor-specific, non-standard interfaces may appear which makes interoperability difficult, unstable, risky, and costly.

In commercial agreements between Communication Service Providers (CSP), security clauses are embedded in generic Service Level Agreements (SLAs) or do not exist. If defined at all, the definitions are static and often ambiguous.

Typical security related SLA clauses refer to Information Security Management System frameworks, such as ISO 27001 or ISO/IEC 19086-4, and conformance is based on self-assessments or yearly audits and not in dynamic technical measures. More specific clauses may be used to define requirements for vulnerability management, incident handling and endpoint protection. The SLAs are used for defining the expected service level mostly in terms of quality, availability and responsibilities and the consequences in case the CSP fails to comply with the SLA. The evaluation and possible compensations are time-based and relatively infrequent. SLA renegotiations typically take place upon contract renewal and are not dynamic in the nature.

Communication service providers are facing an increasing number of security and privacy threats against their infrastructure, data they process and their services. Without visibility to the security posture and protective measures provided to them by other CSPs, it is difficult to judge in reliable and repeatable manner if their security objectives on security service levels are met and if there is a need for additional mitigation of security risks.

Generic Service Level Agreements do not necessarily include security aspects. Even if defined, the definitions are static and often ambiguous. There is no transparency of the security posture provided by the different CSPs so each individual CSP cannot properly assess the risks associated to their services.

Current disadvantages include:

1. It is not possible for the CSP to place dynamic security requirements to other CSPs.
2. It is not possible for the CSPs to report their own compliance towards the other CSPs' dynamic security requirements, (even if such requirements would exist).

Additionally, the following issues can be identified with current information technology systems:

1. Security is unconnected from other communications network functions, that is, there are no security orchestration capabilities or reference points towards various network functions and network entities.
2. There is no end-to-end security orchestration for services that are distributed between several domains or data centers.
3. Network functions have limited capabilities in terms of providing, exposing, and negotiating security information.
4. In today's solutions security and privacy information is transferred and processed as part of standard communications service orchestration which implies security risks and isolation challenges (defense in depth).
5 Current service level agreements between CSPs are based on performance objectives related to availability and reliability. In few cases when security is taken into consideration, security is still a nonnegotiable meaning that it is not possible to acquire a service with specific security characteristics.
6. No current practice exists on how a CSP can monitor and audit in real time security attributes related to the services they source from another CSP, in order to have a guarantee of security and privacy of the service, or to require updates to security levels of the service.

SUMMARY

According to some embodiments of inventive concepts, a security service orchestration function (SSOF) provides capabilities for security orchestration for an information technology system in a standardized manner. The SSOF enables submitting security service level requests based on security capabilities from a CSP to another CSP through standardized interfaces and reference points. The SSOF negotiates and coordinates the security capabilities and security attributes and their required levels between CSPs. The CSP or SSOF of the CSP can formulate a guaranteed, consistent, and unified common security baseline capability which is a synthesis of capabilities offered by all partner CSPs, i.e., represents the minimum common nominators for security capabilities from all partner CSPs. This common security baseline capability template is used by default by the CSP. The CSP monitors and communicates the compliance status and compliance violations for common security baseline capability on a regular basis or on demand. The CSP can select to use service specific capabilities which are fulfilled only by one or a few CSPs and monitor those attributes or service specific capabilities on a demand basis or according to service specific intervals.

According to some embodiments of inventive concepts, a method implemented by a security service orchestration function (SSOF) in a communication infrastructure, that includes a plurality of communication service providers (CSPs), for orchestration of a security service level agreement (S-SLA) includes receiving a S-SLA request, by a CSP of the plurality of CSPs, from one or more other CSPs of the plurality of CSPs. Each S-SLA request includes a plurality of requirements. The method also includes converting each S-SLA request into a consistent and unified S-SLA offerable to each other CSP. The consistent and unified S-SLA includes security attributes that the CSP is capable of providing the other CSPs. The method also includes offering the consistent and unified S-SLA to each other CSP that submitted the S-SLA request. The method further includes receiving a response from each other CSP. The response from each other CSP includes an acknowledgement or a decline of the consistent and unified S-SLA including a non-repudiation signature of acknowledgement or declining.

According to some embodiments of inventive concepts, a computing device includes processing circuitry and a memory coupled with the processing circuitry. The memory includes instructions that when executed by the processing circuitry causes the computing device to receive a S-SLA request, by a CSP of the plurality of CSPs, from one or more other CSPs of the plurality of CSPs. Each S-SLA request includes a plurality of requirements. The memory also includes instructions that when executed by the processing circuitry causes the computing device to convert each S-SLA request into a consistent and unified S-SLA offerable to each other CSP. The consistent and unified S-SLA includes security attributes that the CSP is capable of providing to the other CSPs. The memory also includes instructions that when executed by the processing circuitry causes the computing device to offer the consistent and unified S-SLA to each other CSP that submitted the S-SLA request. The memory further includes instructions that when executed by the processing circuitry causes the computing device to receive a response from each other CSP. The response from each other CSP includes an acknowledgement or a decline of the consistent and unified S-SLA including a non-repudiation signature of acknowledgement or declining.

According to some embodiments of inventive concepts, a computing device is adapted to receive a S-SLA request, by a CSP of the plurality of CSPs, from one or more other CSPs of the plurality of CSPs. Each S-SLA request includes a plurality of requirements. The computing device is also adapted to convert each S-SLA request into a consistent and unified S-SLA offerable to each other CSP. The consistent and unified S-SLA includes security attributes that the CSP is capable of providing to the other CSPs. The computing device is also adapted to offer the consistent and unified S-SLA to each other CSP that submitted the S-SLA request. The computing device is further adapted to receive a response from each other CSP. The response from each other CSP includes an acknowledgement or a decline of the consistent and unified S-SLA including a non-repudiation signature of acknowledgement or declining.

According to some embodiments of inventive concepts, a method implemented by a security service orchestration function (SSOF) in a communication infrastructure, that includes a plurality of communication service providers (CSPs), for orchestration of a security service level agreement (S-SLA) includes transmitting a S-SLA request, by a CSP of the plurality of CSPs, to one or more other CSPs of the plurality of CSPs. The S-SLA request includes security attributes and associated levels to support specific business services with specific security attributes. The method also includes receiving a response from each other CSP including a unique S-SLA based on the S-SLA request. The unique S-SLA from each other CSP includes security attributes the other CSP is capable of providing. The method also includes merging the security attributes received from each other CSP into a common security baseline template S-SLA for communication to business services users of the CSP.

According to some embodiments of inventive concepts, a computing device includes processing circuitry and a memory coupled with the processing circuitry. The memory includes instructions that when executed by the processing circuitry causes the computing device to transmit a S-SLA request, by a CSP of the plurality of CSPs, to one or more other CSPs of the plurality of CSPs. The S-SLA request includes security attributes and associated levels to support specific business services with specific security attributes. The memory also includes instructions that when executed by the processing circuitry causes the computing device to receive a response from each other CSP including a unique S-SLA based on the S-SLA request. The unique S-SLA from each other CSP includes security attributes the other CSP is capable of providing. The memory further includes instructions that when executed by the processing circuitry causes the computing device to merge the security attributes received from each other CSP into a common security baseline template S-SLA for communication to business services users of the CSP.

According to some embodiments of inventive concepts a computing device is adapted to transmit a S-SLA request, by a CSP of the plurality of CSPs, to one or more other CSPs of the plurality of CSPs. The S-SLA request includes security attributes and associated levels to support specific business services with specific security attributes. The computing device is also adapted to receive a response from each other CSP including a unique S-SLA based on the S-SLA request. The unique S-SLA from each other CSP includes security attributes the other CSP is capable of providing. The computing device is further adapted to merge the security attributes received from each other CSP into a common security baseline template S-SLA for communication to business services users of the CSP.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
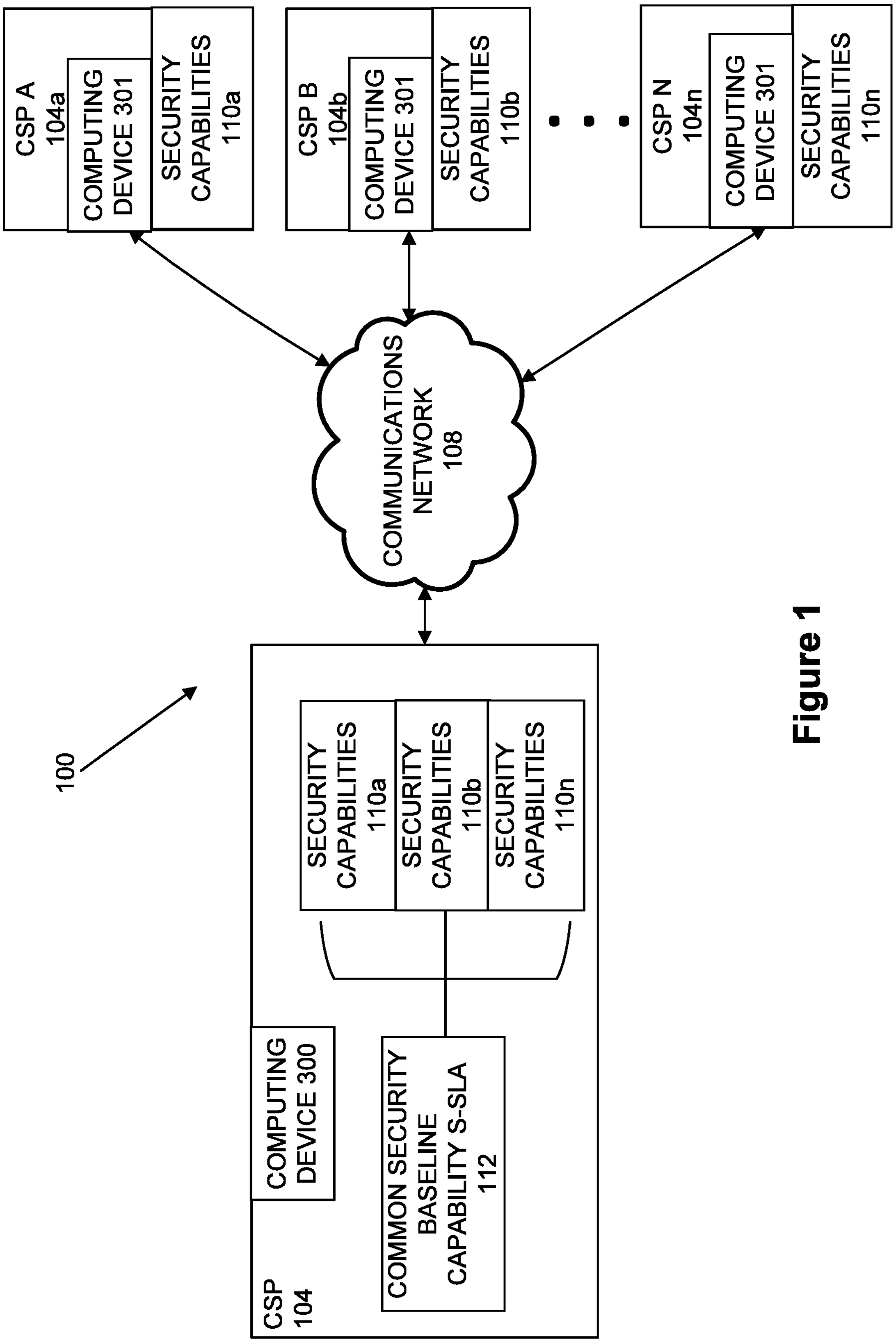
FIG. 1 is a block diagram of an example of a communication system including a security service level agreement (S-SLA) negotiation schema according to some embodiments of inventive concepts.
Figure 3:
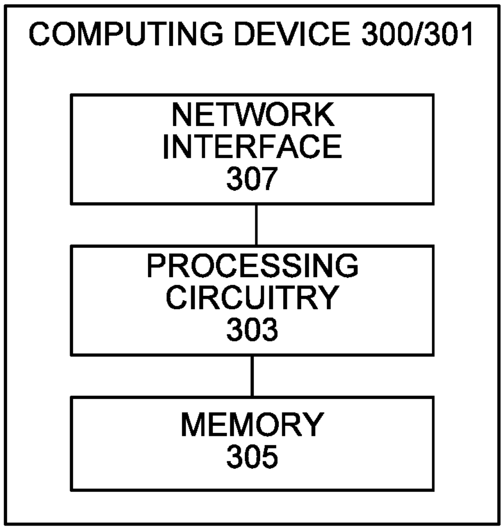
FIG. 3 is a block diagram of an example of a computing device according to some embodiments of inventive concepts.

FIG. 1 is a block diagram of an example of a communication system 100 including a security service level agreement (S-SLA) negotiation schema according to some embodiments of inventive concepts. Embodiments of the inventive concepts described herein are applicable to any communication system or information technology system based on network elements and appliances. The exemplary communication system 100 includes a communication service provider (CSP) 104 and one or more other CSPs 104*a*-104*n* of a plurality of CSPs. As described in more detail herein, each of the other CSPs 104*a*-104*n* include security capabilities 110*a*-110*n* that can be offered to other CSPs. The CSP 104 and the other CSPs 104*a*-104*n* communicate with one another via a communications network 108. The communications network 108 is any type of communications network, e.g., a wireless communications network, a wired communications network or combination wireless and wired communications network. In accordance with some examples, the CSP 104 includes a computing device 300 and each of the other CSPs includes a computing device 301. An example of a computing device 300 and 301 that may be used will be described with reference to FIG. 3. The CSP 104 and each of the other CSP's 104*a*-104*n* may include any type of computing devices or communications device including additional components and different types of components than those illustrated in the example in FIG. 3. The exemplary computing device 300 or 301 illustrated in FIG. 3 is shown as including minimal generic components for performing the inventive concepts described herein.

Figure 2:
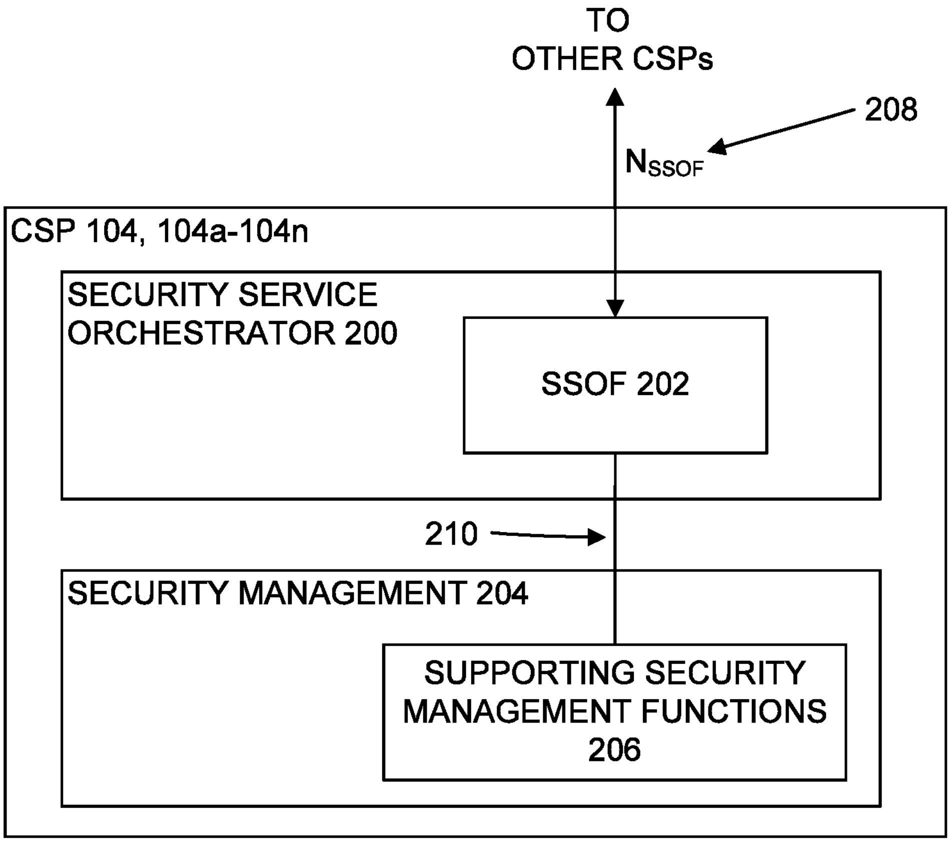
FIG. 2 is a block diagram of an example of a security service orchestrator and security management module according to some embodiments of inventive concepts.

S-SLA enablement and enforcement in a communication system or information technology system, e.g., system 100 is implemented as a security service orchestration function (SSOF) 202 embodied in a security service orchestrator 200 (FIG. 2). The SSOF 202 interacts directly with different network functions.

The communication system 100 or information technology system is designed to be able to offer a different mix of capabilities to meet very diverse service requirements at the same time. This means that security requirements for service may also be very different from industry to industry, service to service and per business customer or enterprise.

In general problems with existing solutions is that it is not possible for a CSP to place (dynamic) security requirements to another CSP and later monitor the compliance of how well these requirements are achieved by that other CSP. There is a need to have a well-defined standardized list of security attributes that can characterize security capabilities for the network services. These security attributes are negotiable between CSPs.

Different CSPs have different security needs to protect their service, thus negotiable security attributes may vary a lot depending on the CSP and the industry segment to which the CSP provides services. A CSP operating in a public safety area may have rather different security requirements to protect their services than for instance a CSP offering services in the automotive, energy, healthcare, or manufacturing industry.

Negotiable security attributes can be categorized based on the main security principles: confidentiality, integrity, authentication and authorization, availability, expanded with separate categories for isolation and data sovereignty.

CSPs 104 can define in a negotiation phase what security attributes they want to include in their Security Service Level Agreements and whether they are applicable for all the services or part of the services. Attribute values, that is, strength of security protection may vary when service is offered for different locations or from different data centers. Examples of security attribute categories and attribute values or strength of security protection include:

- Confidentiality attributes (C) ensure that the service is protected from unwanted information disclosure, e.g., packets/traffic are not possible of disclose outside the service.

Different crypto algorithms and strength for those algorithms can be requested.

Examples for confidentiality attributes that can be requested for the services are, e.g., different strengths for Advanced Encryption Standard (AES): AES-128, AES-192, AES-256 and Triple Data Encryption Algorithm (TDES).

- Integrity attributes (I) ensure that the service integrity can be preserved, e.g., packets/traffic is not tampered with or replaced without noticing. Different integrity algorithms and strength for those algorithms can be requested. Examples of integrity attributes that can be requested for the services are, e.g., different strengths for Secure Hash Algorithms (SHA): SHA-2, SHA-3, SHAKE128, SHAKE256.
- Authentication and authorization attributes (AA) ensure that only authorized persons, user accounts and network elements can interact with the service. Different authentication and authorization mechanisms for the service can be requested. Examples of authentication and authorization mechanisms are, e.g., multi-factor authentication for users, strong Key based authentication, Role Based Access Control (RBAC) or Attribute Based Access Control (ABAC).
- Non-repudiation attributes (NR) ensure the assurance that someone cannot deny something. Non-repudiation artifacts include: an identity, the authentication of that identity and tangible evidence connecting the identified party to a particular communication or action. Different non-repudiation mechanisms can be requested, for instance different digital signature algorithms such as RSA, DSA, ECDSA, RSA with SHA.
- Availability attributes (A) ensure that the service and network functions providing the service remain accessible all the time for authorized users. Different availability mechanisms can be requested. Examples of availability mechanisms are extra security functions to be instantiated or activated, e.g., Physical or Virtual Security Functions such as (virtual) Firewalls, Load balancers, Rate limiters, etc.

Isolation attributes (IS) ensure that the service resources are not shared among other network users or services, e.g., information transferred is isolated from that of other service users. Different isolation mechanism can be requested. Examples of isolation mechanisms include service specific isolation to ensure none of the network resources are shared with other customers.

Data sovereignty (DS) attributes ensure that the data always stays within specific jurisdictions or data centers. Different data sovereignty mechanisms can be requested. Examples of data sovereignty attributes are, e.g., requesting allocation of network resources only from allowed IP domains, anonymization and pseudonymization of data if it is not possible to route the data traffic entirely within the specified jurisdictions. Data sovereignty attributes may also indicate that a data object should be dropped if the data object is moving to a forbidden jurisdiction, or before the data object can be transferred to another jurisdiction, the data object is split into smaller parts.

CSP Interworking attributes ensure that a specific security service level agreement is fulfilled between CSPs. Examples of interworking attributes exchanged between communication partners include for example:
- Internet Protocol Security (IPSec) parameter configuration (e.g., applicable cryptographic algorithms) between CSPs providing Virtual Private Network Solutions to end-users and enterprises.
- IP Address of IPsec gateway (GW) for traffic between network security domains.
- List of preferred IP exchanges (IPXs) to be used for a trusted interexchange points e.g., regarding signaling security protection.

Each CSP has their own security intent and objectives which is driven by security risk evaluation and understanding. Each CSP translates this security risk evaluation into security attributes defined in the CSP's S-SLA. For example, the S-SLA may include information as to what extent the CSP tolerates variation in different attributes and what measures are mandatory to achieve their desired protection level.

The example in FIG. 1 illustrates Security Service Level Agreement (S-SLA) negotiation between different CSPs 104. FIG. 1 illustrates how CSP security attributes are negotiated:

S-SLA negotiation between CSP 104 and another CSP 104*a*-104*n* where the CSP 104 converts S-SLA requirements from other CSPs 104*a*-104*n* into a consistent unified S-SLA (common baseline capability S-SLA 112) offered to other CSPs 104*a*-104*n*.

CSP 104 has, based on its own security risk assessment and ambition level, its own communications network specific security requirements that are applied to its network and services.

CSP 104 negotiates with another CSP 104-104*n* what is the security service level that can be achieved between the parties, an S-SLA request is based on a CSP's own security policy the CSP wants to fulfill.

As a result of the negotiation, there is mutual understanding for the agreed S-SLA between the CSPs in roaming situations. Based on the agreed S-SLA, S-SLA monitoring for compliance takes place and compliance is communicated between the CSPs.

FIG. 2 is a block diagram of an example of a security service orchestrator 200 and security management module 204 according to some embodiments of inventive concepts. In the example in FIG. 2, the security service orchestrator 200 includes the SSOF 202. The security service orchestrator 200 is a component of the CSP 104 and 104*a*-104*n*. In other examples, the security service orchestrator 200 and/or SSOF 202 are a separate component associated with the CSP 104 or 104*a*-104*n*. The security management module 204 includes supporting security management functions 206. Examples of operations or functions of the supporting security management functions 206 will be described with reference to FIGS. 5 and 6. The SSOF 202 includes a northbound interface which is Nssof reference point 208 configured to interface with each other CSP 104*a*-104*n* for negotiating the S-SLA with each other CSP 104*a*-104*n* and for exchanging information on S-SLA security attributes. The Nssof reference point 208 includes interfaces Nssof_EnterpriseS-SLAOrchestrationCSP and Nssof_EnterpriseS-SLAComplianceCSP. The SSOF 202 also includes a southbound interface 210 for interacting with the supporting security management functions 206. Information on the consistent and unified S-SLA or common security baseline capability S-SLA 112 and respective security attributes are transferred between the CSP 104 and the other CSPs 104*a*-104*n* over the Nssof reference point 208. The following Network Function (NF) services are specified for the SSOF 202 as illustrated in FIG. 2:

| Service name | Description |
|---|---|
| Nssof_EnterpriseS-SLAOrchestrationCSP | Used for being informed about S-SLA and the negotiable security attributes between CSPs |
| Nssof_EnterpriseS-SLAComplianceCSP | Used for being informed about S-SLA compliance status and compliance violations for the agreed security policies and attributes between CSPs |

The SSOF 202 is the primary security orchestration function communicating between CSPs 104 and supporting security management function 206. The objective of SSOF 202 is to ensure consistency of security policies. The described mechanism can be applied to privacy attributes in a similar way.

Core functionality of SSOF 202 in a communication infrastructure is to:
- Receive S-SLA requests from other CSPs.
- Convert different S-SLA requirements from other CSPs into consistent and unified S-SLA that can be offered to those CSPs.
- Transform security service level requests from CSPs into to security policies and controls to be enforced within CSP own infrastructure.

An example of a method of operation of a SSOF will be described in more detail with reference to FIG. 4.

FIG. 3 is a block diagram of an example of a computing device 300/301 according to some embodiments of inventive concepts. In accordance with some examples, as previously described, the CSP 104 includes a computing device 300 and each of the other CSPs include a computing device 301. In the example in FIG. 3, the computing devices 300 and 301 are shown as being the same and including the same components; however, in other examples, the computing devices 300 and 301 may include different components. The embodiment shown in FIG. 3 includes exemplary components for performing the inventive concepts described herein. The exemplary computing device 300 or 301 includes processing circuitry 303, a memory 305 and a network interface circuitry 307. The processing circuitry 303 may control network interface circuitry 307 to transmit communications through network interface circuitry 307 to one or more network nodes of the communications network 108 or other CSPs 104*a*-104*n* in the example in FIG. 1 and/or to receive communications through the network interface circuitry 307 from one or more network nodes or other CSPs 104-104*n* to perform the inventive concepts described herein. Moreover, modules may be stored in memory 305, and these modules may provide instructions so that when instructions of a module are executed by processing circuitry 303, processing circuitry 303 performs respective operations. In some examples, the memory 305 coupled with the processing circuitry 303 includes instructions that when executed by the processing circuitry 305 causes the computing device 300 or 301 to perform at least some of the functions of the methods described herein. In some examples, the methods described herein performed by the SSOF 202 and the supporting security management functions 206 are embodied in and performed by one or more computing devices that are the same or similar to computing device 300 or 301. For example, the SSOF 202 and the supporting security management function 206 are embodied on the same computing device 300 or 301 or separate computing devices 300 or 301.

Figure 4:
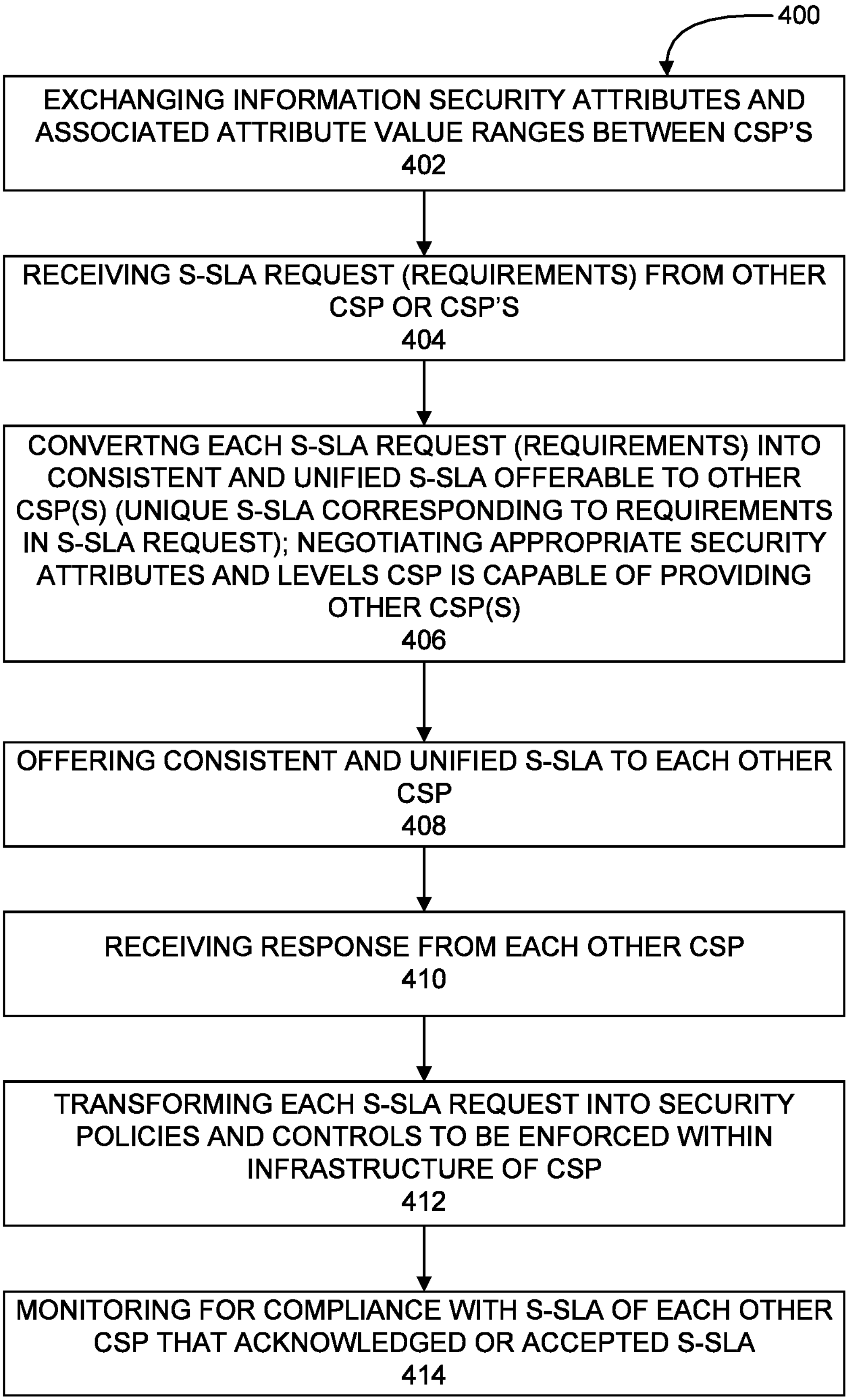
FIG. 4 is a flow chart of an example of a method of operation of a security service orchestration function (SSOF) according to some embodiments of inventive concepts.

FIG. 4 is a flow chart of an example of a method 400 of operation of a security service orchestration function (SSOF) according to some embodiments of inventive concepts. The method 400 is implemented by a security service orchestration function (SSOF), such as SSOF 202 in FIG. 2, in a communication infrastructure, that includes a plurality of communication service providers (CSPs), e.g., CSP 104 and other CSPs 104*a*-104*n*, for orchestration of a security service level agreement (S-SLA), for example, common security baseline capability S-SLA 112.

In block 402, the method 400 includes exchanging information security attributes and associated attribute value ranges between the plurality of CSPs that each CSP is capable of providing the other CSPs or that one CSP is capable of requesting from another CSP.

In block 404, the method 400 includes receiving a S-SLA request, by a CSP of the plurality of CSPs, from one or more other CSPs of the plurality of CSPs. Each S-SLA request includes a plurality of requirements or security requirements. In some examples, receiving the S-SLA request includes receiving a S-SLA request to support specific business services with specified security attributes.

The S-SLA request from each other CSP 104*a*-104*n* includes a plurality of optional information elements or objects and mandatory information elements or objects. Examples of the optional information elements or objects and mandatory information elements or objects are included in the table below.

| Information element | Description | Category |
|---|---|---|
| Target CSP identifier | Indicates CSP that requests the S-SLA fulfillment | Mandatory |
| Confidentiality attributes | Defines the confidentiality related security attributes to be fulfilled | Optional |
| Target integrity attributes | Defines the integrity related security attributes to be fulfilled | Optional |
| Target authentication attributes | Defines the authentication related security attributes to be fulfilled | Optional |
| Target availability attributes | Defines the availability related security attributes to be fulfilled | Optional |
| Target non-repudiation attributes | Defines the non-repudiation related security attributes to be fulfilled | Optional |
| Target isolation attributes | Defines the isolation related security attributes to be fulfilled | Optional |
| Target data sovereignty attributes | Defines the data sovereignty related security attributes to be fulfilled | Optional |
| Validity condition | Indicates that S-SLA applies only to the specific locations or area of interest | Optional |
| Temporal validity conditions | Time interval for periodic S-SLA re-registration or handshake | Optional |
| Subscription of S-SLA compliance monitoring events | Defines the regular interval for compliance notifications | Optional |
| Allowed IP-domains | Indicates which IP-domains are allowed for data to be passed through without extra protection | Optional |
| Extra data protection controls | Indicates which extra data protection options are required if there are no available routing options only within allowed IP-domains | Optional |

In some examples, the plurality of optional information elements or objects include, confidentiality attributes, target integrity attributes, target authentication attributes, target availability attributes, target non-repudiation attributes, target isolation attributes, target data sovereignty attributes, validity condition, temporal validity condition, subscription of S-SLA compliance monitoring events, allowed internet protocol (IP) domains, and extra data protection controls. In some examples, the mandatory information elements or objects include a target CSP identifier.

In block 406, the method 400 includes converting each S-SLA request into a consistent and unified S-SLA that is offerable to each other CSP. The consistent and unified S-SLA includes security attributes that the CSP is capable of providing the other CSPs. The method 400 in block 406 also includes negotiating a set of appropriate security attributes and associated levels or values with each other CSP 104*a*-104*n*, that the CSP 104 is capable of providing each of the other CSPs 104*a*-104*n*. In some examples, the consistent and unified S-SLA corresponds to a common security baseline capacity S-SLA 112 that is offered by the CSP 104 to each of the other CSPs 104*a*-104*b*. An example of a process for generating the common security baseline capacity S-SLA 112 is described with reference to block 702 in FIG. 7.

In block 408, the method 400 includes offering the consistent and unified S-SLA to each other CSP 104*a*-104*n* that submitted the S-SLA request.

In block 410, the method 400 includes receiving a response from each other CSP 104*a*-104*n*. The response from each other CSP 104*a*-104*n* includes an acknowledgement or a decline of the consistent and unified S-SLA including a non-repudiation signature of acknowledgement or declining.

In block 412, the method 400 includes transforming each S-SLA request into security policies and controls to be enforced within an infrastructure of the CSP 104.

In block 414, the method 400 includes monitoring of compliance with the consistent and unified S-SLA of each other CSP that acknowledged or accepted the consistent and unified S-SLA.

Figure 5:
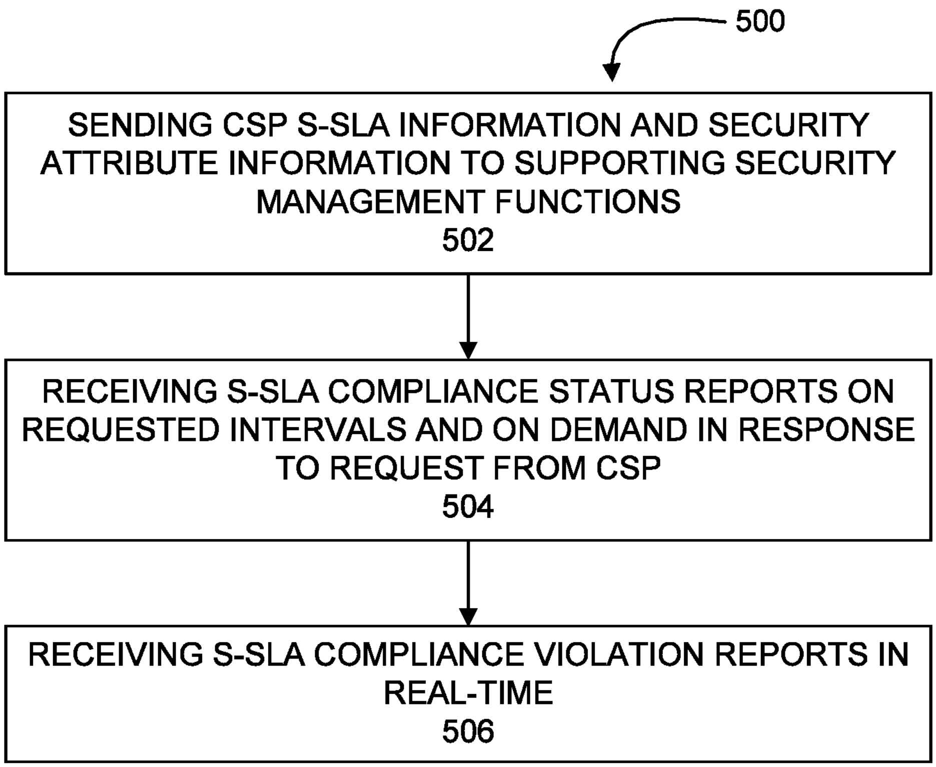
FIG. 5 is a flow chart of an example of a method of operation of a SSOF interacting with supporting security management functions according to some embodiments of inventive concepts.

FIG. 5 is a flow chart of an example of a method 500 of operation of a SSOF interacting with supporting security management functions according to some embodiments of inventive concepts. The SSOF interacts with supporting security management functions to perform a set of functions as indicated by the method 500. In block 502, the method 500 includes sending S-SLA information and security attribute information associated with a particular CSP to the supporting security management functions, e.g., supporting and security management functions 206 in FIG. 2. In block 504, the method 500 includes receiving S-SLA compliance status reports on requested intervals and on demand in response to a request from the particular CSP. In block 506, the method 500 includes receiving S-SLA compliance violation reports in real-time.

Figure 6:
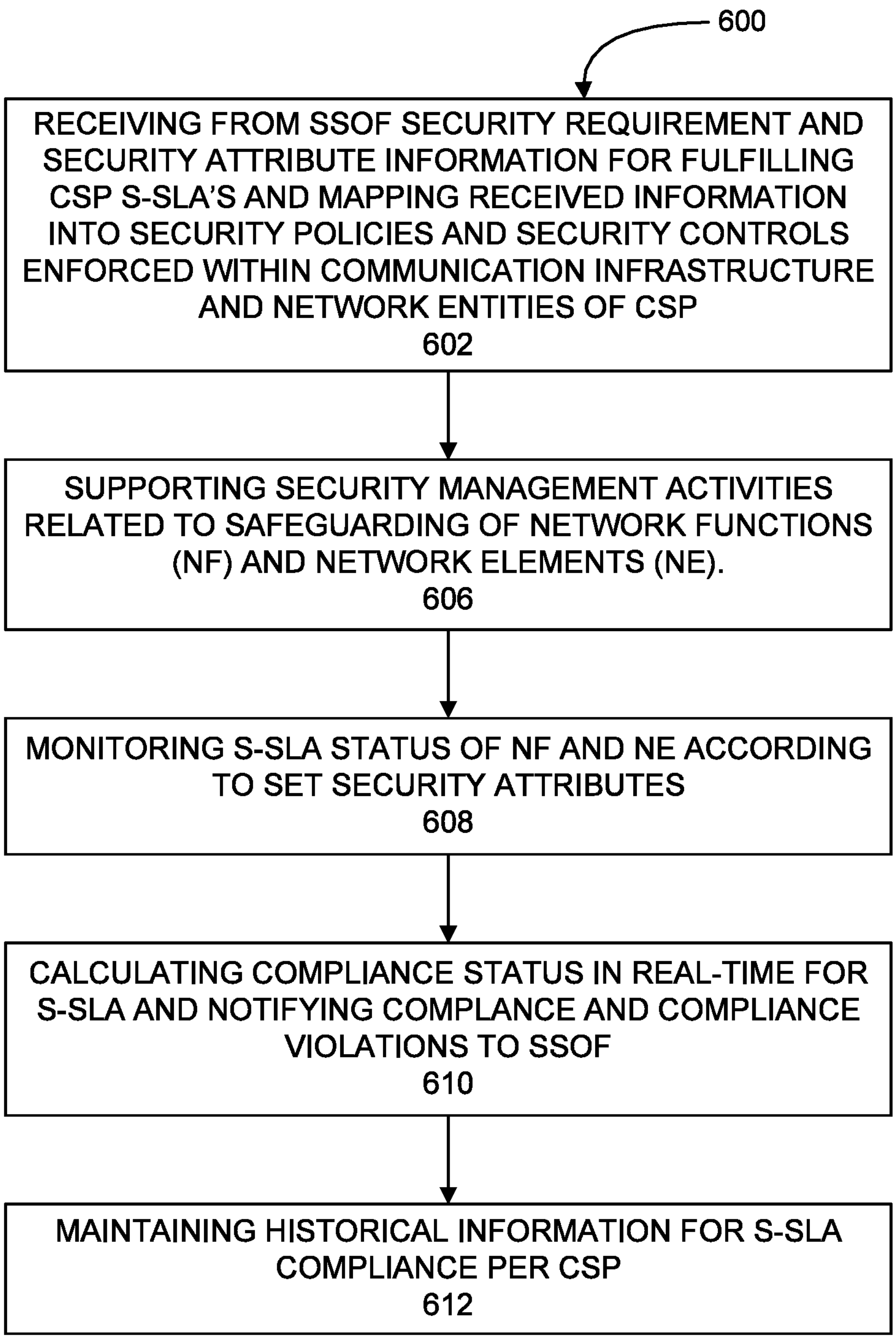
FIG. 6 is a flow chart of an example of a method of operation of supporting security management functions according to some embodiments of inventive concepts.

FIG. 6 is a flow chart of an example of a method 600 of operation of supporting security management functions according to some embodiments of inventive concepts. The supporting security management functions include at least one of the functions of blocks 602-612. As illustrated in FIG. 2, there are supporting security management functions 206 that provide information to the SSOF 202 and which receive information and action requests from the SSOF 202. The supporting security management functions provide typically the type of supporting functions described in the method 600; however, the security management functions are not limited to those in the method 600.

In block 602, the method 600 includes receiving, from the SSOF, security requirement and security attribute information for fulfilling the S-SLA of each other CSP and mapping the security requirement and security attribute information into security policies and security controls for enforcement within the communication infrastructure and network entities of the CSP.

In block 606, the method 600 includes supporting security management activities related to safeguarding of network functions (NF) and network elements (NE).

In block 608, the method 600 includes monitoring S-SLA status of NF and NE according to set security attributes.

In block 610, the method 600 includes calculating compliance status in real-time for the S-SLA of each CSP and notifying compliance scores and compliance violations to the security service orchestration function.

In block 612, the method 600 includes maintaining historical information for S-SLA compliance per CSP.

Figure 7A:
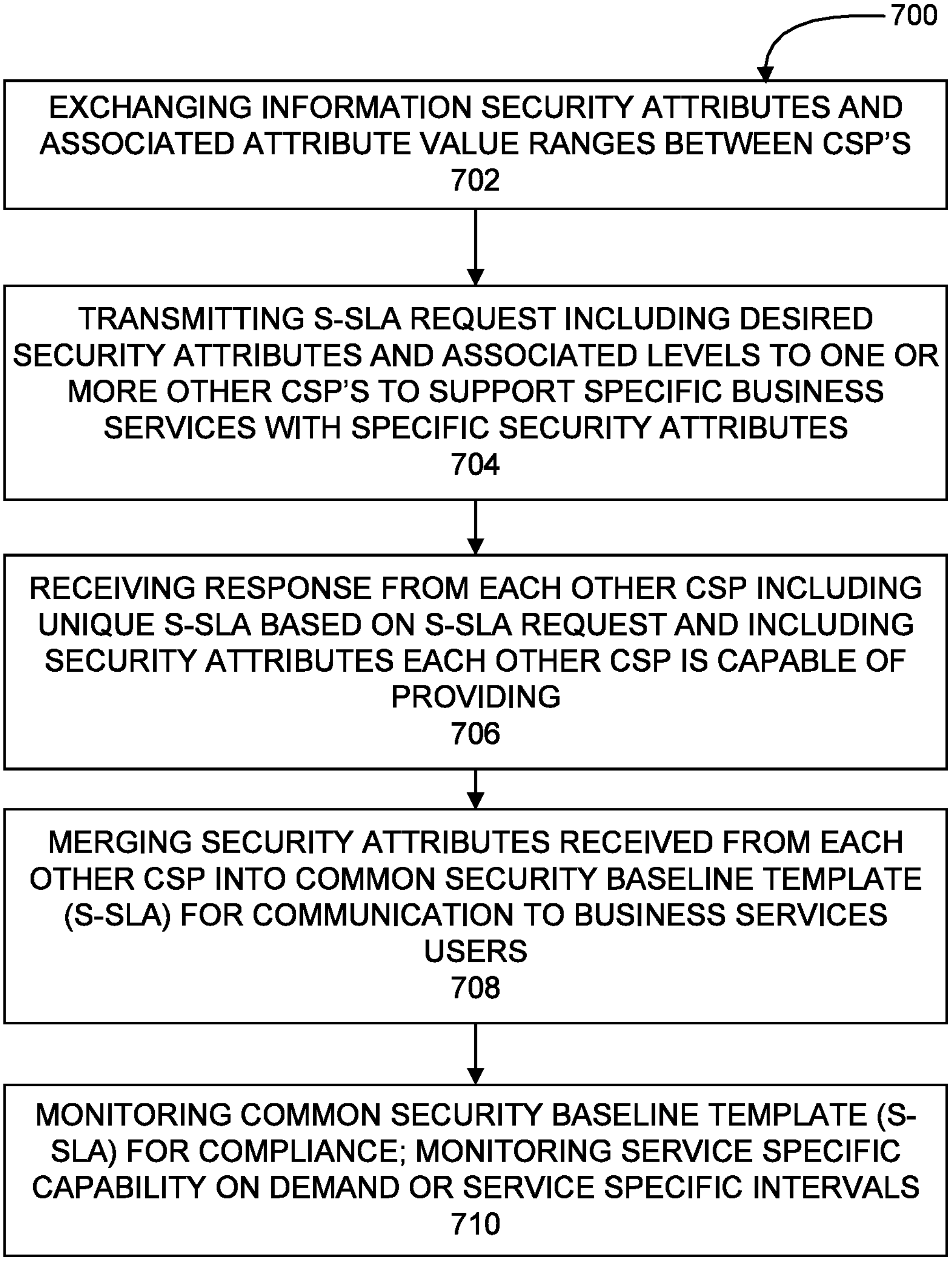
FIG. 7A is a flow chart of an example of a method of operation of a security service orchestration function (SSOF) according to some embodiments of inventive concepts.

FIG. 7A is a flow chart of an example of a method 700 of operation of a security service orchestration function (SSOF) according to some embodiments of inventive concepts. The method 700 covers negotiation between the different CSPs 104 and 104*a*-104*n* in FIG. 1 to generate agreed and guaranteed security attributes between the CSPs. In accordance with some examples, the method 700 is implemented by a security service orchestration function (SSOF) in a communication infrastructure, that includes a plurality of communication service providers (CSPs), for orchestration of a security service level agreement (S-SLA).

Figure 7B:
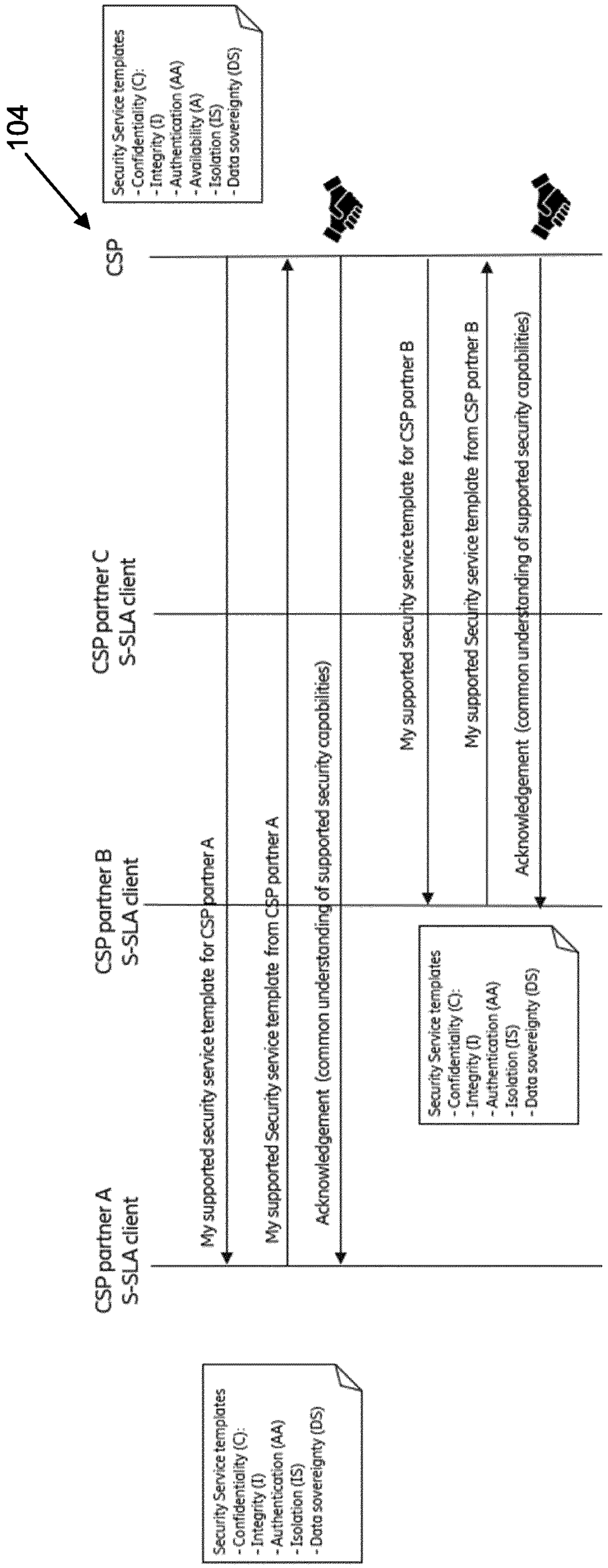
FIG. 7B is an illustration of an example of exchanging security attributes and associated attribute value ranges between CPSs in FIG. 7A according to some embodiments of inventive concepts.

In block 702, the method 700 includes exchanging information security attributes and associated attribute value ranges between the plurality of CSPs that each CSP is capable of providing the other CSPs. Referring also to FIG. 7B, FIG. 7B is an illustration of an example of exchanging security attributes and associated attribute value ranges between CPS's according to some embodiments of inventive concepts. As illustrated in the example in FIG. 7B, the CSP 104 transmits a "My supported security service template for CSP partner A" and a "My supported security service template for CSP partner B" to CSP partner A and CSP partner B. CSP partner A responds by transmitting "My supported security service template from CSP partner A" to CSP 104, and CSP partner B responds by transmitting "My supported security template from CSP partner B" to CSP 104. The CSP 104 transmits an acknowledgement to each of CSP partner A and CSP partner B including a common understanding of supported security capabilities.

Figure 7C:
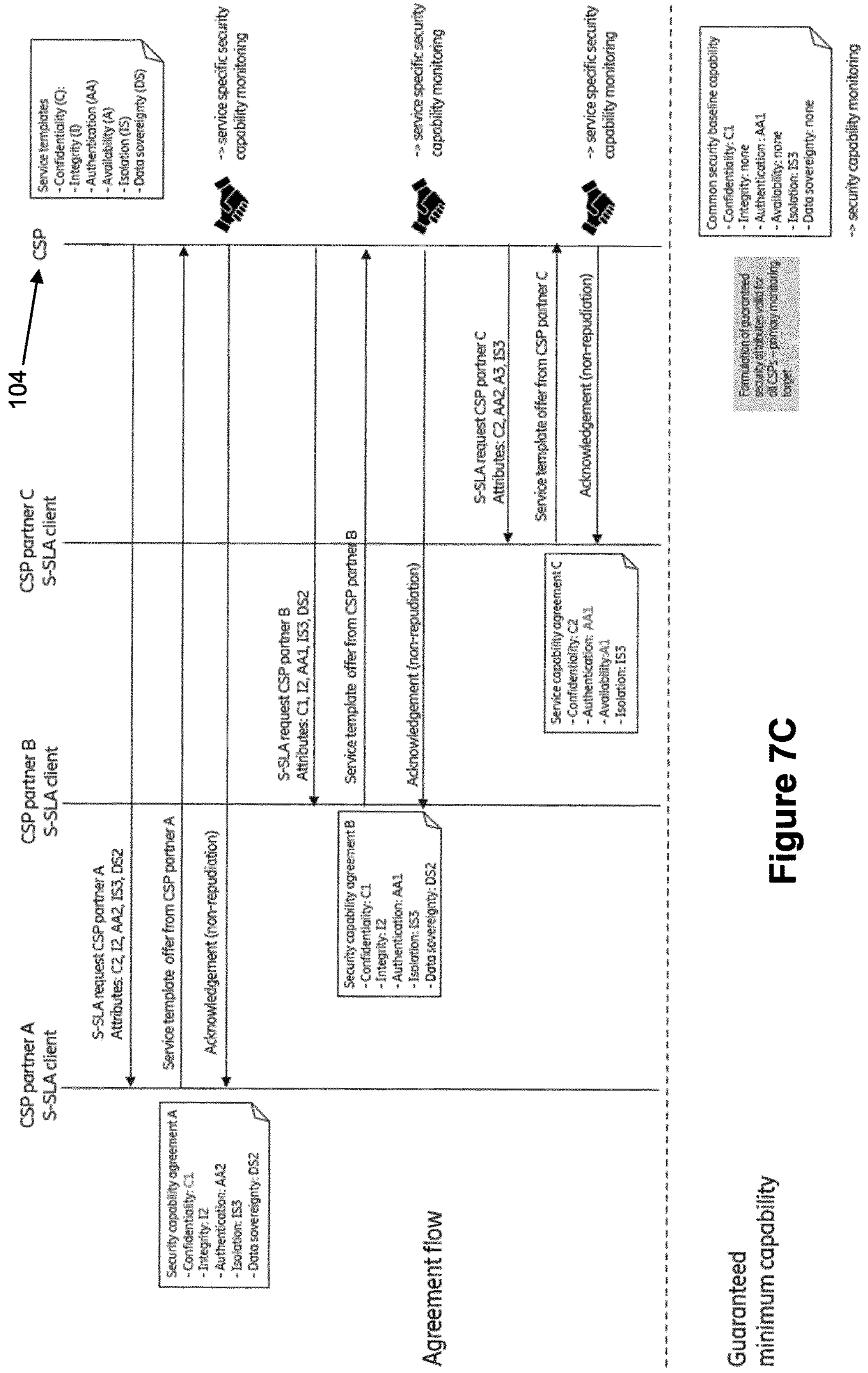
FIG. 7C is an illustration of an example of an agreement flow for S-SLA negotiation between CSPs in FIG. 7A according to some embodiments of inventive concepts.

In block 704, the method 700 includes transmitting a S-SLA request, by a CSP of the plurality of CSPs, to one or more other CSPs of the plurality of CSPs. The S-SLA request includes security attributes and associated levels to support specific business services with specific security attributes. Referring also to FIG. 7C, FIG. 7C is an illustration of an example of an agreement flow for S-SLA negotiation between CSPs in FIG. 7A according to some embodiments of inventive concepts. FIG. 7C illustrates an example of the method steps in at least some of the blocks in FIG. 7A.

In block 706, the method 700 includes receiving a response from each other CSP (CSP partner in FIG. 7C) including a unique S-SLA based on the S-SLA request. The unique S-SLA from each other CSP includes security attributes the other CSP is capable of providing. The unique S-SLA from each other CSP corresponds to the service template offer from each CSP partner illustrated in FIG. 7C. As illustrated in FIG. 7C, CSP 104 sends S-SLA requests to other CSPs (CSP partners A, B and C) to support specific business services with specified security attributes. The other CSPs have different security capabilities for their network domain and services. The other CSPs offer security capability agreements based on the S-SLA request from CSP 104 and each other CSP's own capabilities. The requesting CSP 104 acknowledges the offered security capabilities from each of the other CPS's as shown in FIG. 7C.

Similar to that previously described with reference to block 404 in FIG. 4, the S-SLA request includes a plurality of optional information elements or objects and a mandatory information element or object. In some examples, the plurality of optional information elements or objects include, confidentiality attributes, target integrity attributes, target authentication attributes, target availability attributes, target non-repudiation attributes, target isolation attributes, target data sovereignty attributes, validity condition, temporal validity condition, subscription of S-SLA compliance monitoring events, allowed internet protocol (IP) domains, and extra data protection controls. In some examples, the mandatory information elements or objects include a target CSP identifier.

In block 708 of FIG. 7A, the method 700 includes merging the security attributes received from each other CSP into a common security baseline template S-SLA for communication to business services users of the CSP. The common security baseline template S-SLA corresponds to the common security baseline capability S-SLA 112 in FIG. 1. The common security baseline template S-SLA represents a minimum guaranteed common level of security and provides a default security capability set used for communications services users. The common security baseline template S-SLA provides a security level which can be guaranteed and provided for business services by any other CSP. This default baseline is regularly monitored for compliance as described with reference to FIGS. 8 and 9. If there is a need for stricter security capabilities, the CSP may choose to use capabilities offered by a particular CSP for a specific service or services. Monitoring of this service specific capability can be performed on demand or based on service specific regular intervals.

The method 700 in block 708 also includes negotiating a set of appropriate security attributes and associated levels that each other CSP is capable of providing the CSP that transmitted the S-SLA request.

In accordance with some examples, the method 700 in block 710 includes monitoring, by the CSP, that the other CSPs are in compliance with the common security baseline template S-SLA. In accordance with other examples monitoring, by the CSP, includes monitoring a service specific capability on demand or at service specific intervals.

Figure 8:
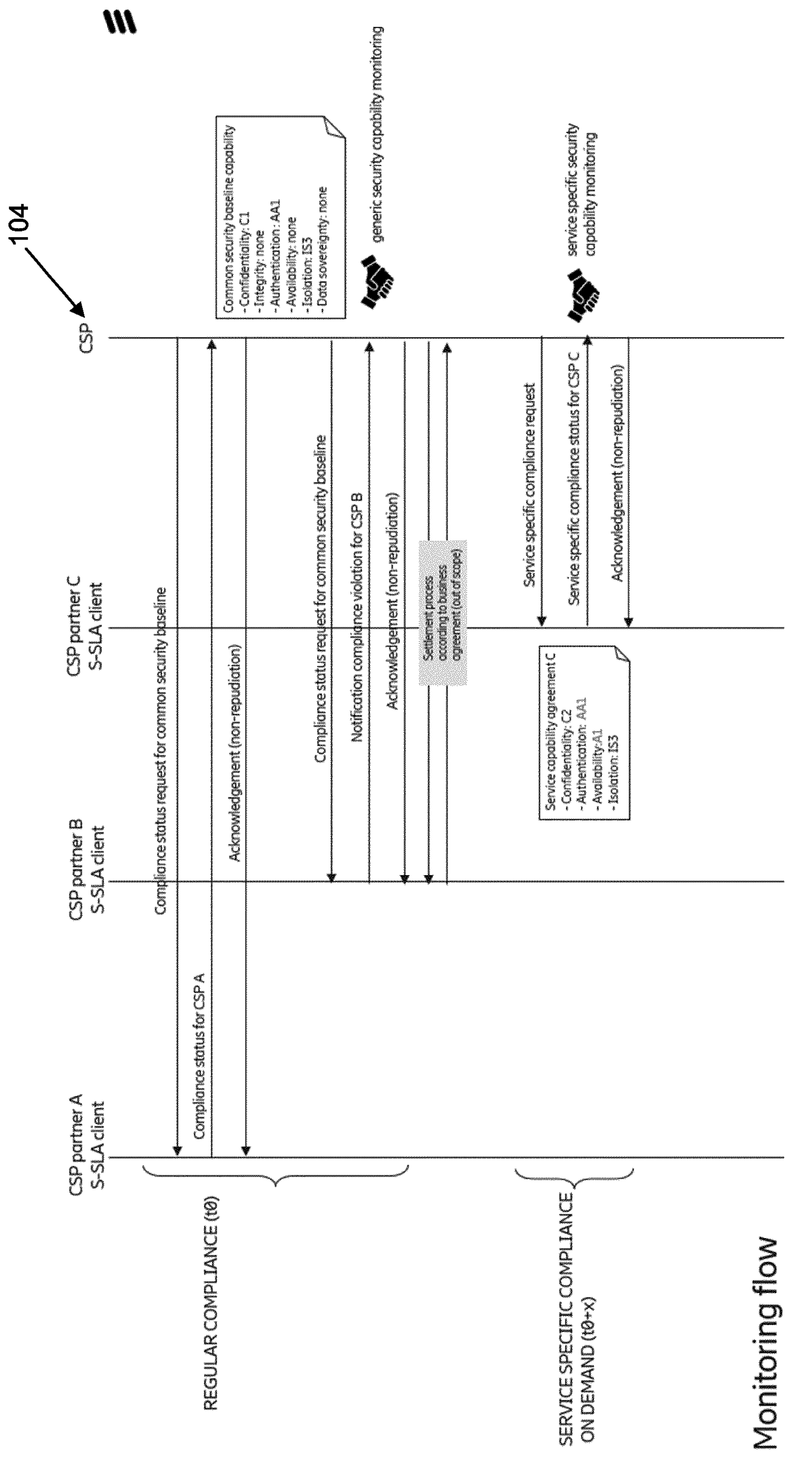
FIG. 8 is an illustration of an example of a monitoring flow for S-SLA fulfillment according to some embodiments of inventive concepts.

FIG. 8 is an illustration of an example of a monitoring flow for S-SLA fulfillment according to some embodiments of inventive concepts. The example monitoring flow in FIG. 8 is an illustration of S-SLA monitoring between CSPs, e.g., CSPs 104 and 104*a*-104*n* in FIG. 1. The CSP 104 monitors agreed S-SLA security attributes for different services within the CSP's own trust domain and the CSP's external trust domain. For example, in a 3GPP architecture, the CSP's own trust domain represents a home public land mobile network (HPLMN), and an external trust domain represents a visited public land mobile network (VPLMN). Another example is a cloud service where cloud service provider's own trust domain represent data centers within the same geographical area and external trust domain represents data centers under different jurisdiction.

The CSP 104 monitors S-SLA compliance and requests reports from another CSP (CSP partner) on regular intervals. This is repeated per CSP or CSP partner based on the common security baseline capacity. The CSP 104 can request a compliance snapshot on demand for specific services based on an explicit security capability agreement from a specific CSP at random intervals or service specific regular intervals for monitoring service specific S-SLA fulfillment. If S-SLA compliance deviates from the agreed level, then a settlement process according to the S-SLA or business agreement is triggered as illustrated in FIG. 8.

Figure 9:
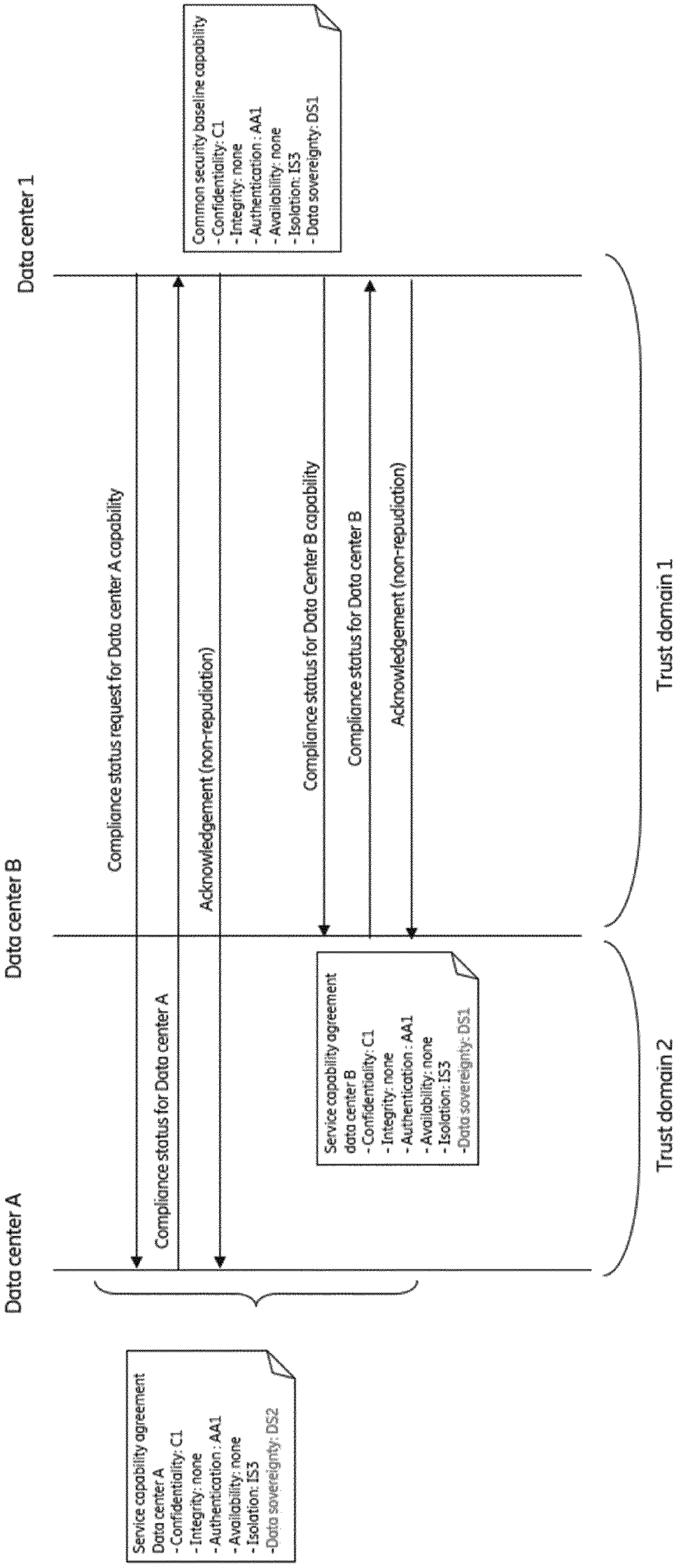
FIG. 9 is an illustration of an example of a monitoring flow for S-SLA fulfillment for different trust domains according to some embodiments of inventive concepts.

FIG. 9 is an illustration of an example of a monitoring flow for S-SLA fulfillment for different trust domains according to some embodiments of inventive concepts. FIG. 9 is an example of another variant for usage of S-SLA agreements and respective monitoring flow, where different data centers within the same CSP are involved. The data centers reside in different trust domains and jurisdictions. The example in FIG. 9 is from a data sovereignty attribute (DS) perspective. The common security baseline capability template S-SLA is applied to data center 1 and other data centers belonging to the same trust domain. For trust domain 2 there is stricter data sovereignty attribute required due to a different jurisdiction and data center A specific S-SLA is applied. The S-SLA monitoring for data center A and data center B is based on the common security baseline capability monitoring. The S-SLA monitoring for data center A is based on the service capability agreement specific data center A with stricter data sovereignty attribute setting.

Example embodiments are discussed below.

1. A method implemented by a security service orchestration function (SSOF) in a communication infrastructure, that includes a plurality of communication service providers (CSPs), for orchestration of a security service level agreement (S-SLA), the method comprising:
   - receiving a S-SLA request, by a CSP of the plurality of CSPs, from one or more other CSPs of the plurality of CSPs, wherein each S-SLA request comprises a plurality of requirements;
   - converting each S-SLA request into a consistent and unified S-SLA offerable to each other CSP, wherein the consistent and unified S-SLA comprises security attributes that the CSP is capable of providing the other CSPs;
   - offering the consistent and unified S-SLA to each other CSP that submitted the S-SLA request; and
   - receiving a response from each other CSP, wherein the response from each other CSP comprises an acknowledgement or a decline of the consistent and unified S-SLA including a non-repudiation signature of acknowledgement or declining.

2. The method of embodiment 1, further comprising exchanging information security attributes and associated attribute value ranges between the plurality of CSPs that each CSP is capable of providing the other CSPs.

3. The method of any of embodiments 1-2, wherein receiving the S-SLA request comprises receiving a S-SLA request to support specific business services with specified security attributes.

4. The method of any of embodiments 1-3, further comprising negotiating a set of appropriate security attributes and levels that the CSP is capable of providing each of the other CSPs.

5. The method of any of embodiments 1-4, wherein the S-SLA request from each other CSP comprises a plurality of optional information elements or objects and a mandatory information element or object,
   - wherein the plurality of optional information elements or objects comprises, confidentiality attributes, target integrity attributes, target authentication attributes, target availability attributes, target non-repudiation attributes, target isolation attributes, target data sovereignty attributes, validity condition, temporal validity conditions, subscription of S-SLA compliance monitoring events, allowed internet protocol (IP) domains, and extra data protection controls, and
   - wherein the mandatory information element or object comprise a target CSP identifier.

6. The method of any of embodiments 1-5, further comprising transforming each S-SLA request into security policies and controls to be enforced within an infrastructure of the CSP.

7. The method of any of embodiments 1-6, further comprising monitoring of compliance with the consistent and unified S-SLA of each other CSP that acknowledged or accepted the consistent and unified S-SLA.

8. The method of any of embodiments 1-7, wherein the SSOF interacts with supporting security management functions to perform a set of functions comprising:
   - sending S-SLA information and security attribute information associated with a particular CSP to the supporting security management functions;
   - receiving S-SLA compliance status reports on requested intervals and on demand in response to a request from the particular CSP; and
   - receiving S-SLA compliance violation reports in real-time.

9. The method of embodiment 8, wherein the supporting security management functions comprise at least one of:
   - receiving, from the SSOF, security requirement and security attribute information for fulfilling the S-SLA of each other CSP and mapping the security requirement and security attribute information into security policies and security controls for enforcement within the communication infrastructure and network entities of the CSP;

supporting security management activities related to safeguarding of network functions (NF) and network elements (NE);

monitoring S-SLA status of NF and NE according to set security attributes;

calculating compliance status in real-time for the S-SLA of each CSP and notifying compliance scores and compliance violations to the security service orchestration function; and maintaining historical information for S-SLA compliance per CSP.

10. The method of any of embodiments 1-9, wherein the SSOF comprises an Nssof reference point configured to interface with each other CSP for negotiating the S-SLA with each other CSP and for exchanging information on S-SLA security attributes.

11. A computing device (300) comprising:

processing circuitry (303); and memory (305) coupled with the processing circuitry, wherein the memory includes instructions that when executed by the processing circuitry causes the computing device to, receive a S-SLA request, by a CSP of the plurality of CSPs, from one or more other CSPs of the plurality of CSPs, wherein each S-SLA request comprises a plurality of requirements;

convert each S-SLA request into a consistent and unified S-SLA offerable to each other CSP, wherein the consistent and unified S-SLA comprises security attributes that the CSP is capable of providing to the other CSPs;

offer the consistent and unified S-SLA to each other CSP that submitted the S-SLA request; and receive a response from each other CSP, wherein the response from each other CSP comprises an acknowledgement or a decline of the consistent and unified S-SLA including a non-repudiation signature of acknowledgement or declining.

12. The computing device of embodiment 11, wherein the memory includes instructions that when executed by the processing circuitry causes the computing device to perform operations according to any of embodiments 2-10.

13. A computing device (300) adapted to:

receive a S-SLA request, by a CSP of the plurality of CSPs, from one or more other CSPs of the plurality of CSPs, wherein each S-SLA request comprises a plurality of requirements;

convert each S-SLA request into a consistent and unified S-SLA offerable to each other CSP, wherein the consistent and unified S-SLA comprises security attributes that the CSP is capable of providing to the other CSPs;

offer the consistent and unified S-SLA to each other CSP that submitted the S-SLA request; and receive a response from each other CSP, wherein the response from each other CSP comprises an acknowledgement or a decline of the consistent and unified S-SLA including a non-repudiation signature of acknowledgement or declining.

14. The computing device of embodiment 13 further adapted to perform according to any of embodiments 2-10.

15. A computer program comprising program code to be executed by processing circuitry (303) of a computing device (300, 301), whereby execution of the program code causes the computing device (300, 301) to perform operations according to any of embodiments 1-10.

16. A computer program product comprising a non-transitory storage medium including program code to be executed by processing circuitry (303) of a computing device (300), whereby execution of the program code causes the computing device (300, 301) to perform operations according to any of embodiments 1-10.

17. A method implemented by a security service orchestration function (SSOF) in a communication infrastructure, that includes a plurality of communication service providers (CSPs), for orchestration of a security service level agreement (S-SLA), the method comprising:

transmitting a S-SLA request, by a CSP of the plurality of CSPs, to one or more other CSPs of the plurality of CSPs, wherein the S-SLA request comprises security attributes and associated levels to support specific business services with specific security attributes;

receiving a response from each other CSP comprising a unique S-SLA based on the S-SLA request, the unique S-SLA from each other CSP comprising security attributes the other CSP is capable of providing; and merging the security attributes received from each other CSP into a common security baseline template S-SLA for communication to business services users of the CSP.

18. The method of embodiment 17, further comprising exchanging information security attributes and associated attribute value ranges between the plurality of CSPs that each CSP is capable of providing the other CSPs.

19. The method of any of embodiments 17-18, further comprising negotiating a set of appropriate security attributes and associated levels that each other CSP is capable of providing the CSP that transmitted the S-SLA request.

20. The method of any of embodiments 17-19, wherein the S-SLA request comprises a plurality of optional information elements or objects and a mandatory information element or object, wherein the plurality of optional information elements or objects comprises, confidentiality attributes, target integrity attributes, target authentication attributes, target availability attributes, target non-repudiation attributes, target isolation attributes, target data sovereignty attributes, validity condition, temporal validity conditions, subscription of S-SLA compliance monitoring events, allowed internet protocol (IP) domains, and extra data protection controls, and wherein the mandatory information element or object comprise a target CSP identifier.

21. The method of any of embodiments 17-20, further comprising monitoring, by the CSP, that the other CSPs are in compliance with the common security baseline template S-SLA.

22. The method of any of embodiments 17-21, further comprising monitoring, by the CSP, a service specific capability on demand or at service specific intervals.

23. The method of any of embodiments 17-22, wherein the SSOF interacts with supporting security management functions to perform a set of functions comprising:

sending S-SLA information and security attribute information associated with a particular CSP to the supporting security management functions;

receiving S-SLA compliance status reports on requested intervals and on demand in response to a request from the particular CSP; and receiving S-SLA compliance violation reports in real-time.

24. The method of embodiment 23, wherein the supporting security management functions comprise at least one of:

receiving, from the SSOF, security requirement and security attribute information for fulfilling the S-SLA of each other CSP and mapping the security requirement and security attribute information into security policies and security controls for enforcement within the communication infrastructure and network entities of the CSP;

supporting security management activities related to safeguarding of network functions (NF) and network elements (NE);

monitoring S-SLA status of NF and NE according to set security attributes;

calculating compliance status in real-time for the S-SLA of each CSP and notifying compliance scores and compliance violations to the security service orchestration function; and maintaining historical information for S-SLA compliance per CSP.

25. The method of any of embodiments 17-24, wherein the SSOF comprises an Nssof reference point configured to interface with each other CSP for negotiating the S-SLA with each other CSP and for exchanging information on S-SLA security attributes.

26. A computing device (300) comprising:

processing circuitry (303); and memory (305) coupled with the processing circuitry, wherein the memory includes instructions that when executed by the processing circuitry causes the computing device to, transmit a S-SLA request, by a CSP of the plurality of CSPs, to one or more other CSPs of the plurality of CSPs, wherein the S-SLA request comprises security attributes and associated levels to support specific business services with specific security attributes;

receive a response from each other CSP comprising a unique S-SLA based on the S-SLA request, the unique S-SLA from each other CSP comprising security attributes the other CSP is capable of providing; and merge the security attributes received from each other CSP into a common security baseline template S-SLA for communication to business services users of the CSP.

27. The computing device of embodiment 26, wherein the memory includes instructions that when executed by the processing circuitry causes the computing device to perform operations according to any of embodiments 18-25.

28. A computing device (300) adapted to:

transmit a S-SLA request, by a CSP of the plurality of CSPs, to one or more other CSPs of the plurality of CSPs, wherein the S-SLA request comprises security attributes and associated levels to support specific business services with specific security attributes;

receive a response from each other CSP comprising a unique S-SLA based on the S-SLA request, the unique S-SLA from each other CSP comprising security attributes the other CSP is capable of providing; and merge the security attributes received from each other CSP into a common security baseline template S-SLA for communication to business services users of the CSP.

29. The computing device of embodiment 28 further adapted to perform according to any of embodiments 18-25.

30. A computer program comprising program code to be executed by processing circuitry (303) of a computing device (300, 301), whereby execution of the program code causes the computing device (300, 301) to perform operations according to any of embodiments 17-25.

31. A computer program product comprising a non-transitory storage medium including program code to be executed by processing circuitry (303) of a computing device (300), whereby execution of the program code causes the computing device (300, 301) to perform operations according to any of embodiments 17-25.

Additional explanation is provided below.

The innovative steps in Security Service Orchestrator Function are that.

Embedding security specific orchestration capabilities into a communication infrastructure to solve security concerns related to the deployment and configuration of the technology.

Introducing the SSOF function to exchange security related information according to industry best practices and communication architectures.

Coverage of security attributes is expanded from CIA to address isolation and data sovereignty.

Common and consistent S-SLA negotiation and handshake between CSPs or across data centers and trust domains.

Increasing trust since there is agreed/standardized mechanism to agree security attributes and security levels between CSPs.

Real-time S-SLA compliance monitoring for S-SLA fulfillment between CSPs or across data centers and trust domains.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the above description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being “connected”, “coupled”, “responsive”, or variants thereof to another element, it can be directly connected, coupled, or responsive to the other element or intervening elements may be present. In contrast, when an element is referred to as being “directly connected”, “directly coupled”, “directly responsive”, or variants thereof to another element, there are no intervening elements present. Like numbers refer to like elements throughout. Furthermore, “coupled”, “connected”, “responsive”, or variants thereof as used herein may include wirelessly coupled, connected, or responsive. As used herein, the singular forms “a”, “an” and “the” are intended to include the plural forms as well, unless the context clearly indicates otherwise. Well-known functions or constructions may not be described in detail for brevity and/or clarity. The term “and/or” includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms “comprise”, “comprising”, “comprises”, “include”, “including”, “includes”, “have”, “has”, “having”, or variants thereof are open-ended, and include one or more stated features, integers, elements, steps, components, or functions but does not preclude the presence or addition of one or more other features, integers, elements, steps, components, functions, or groups thereof. Furthermore, as used herein, the common abbreviation “e.g.,”, which derives from the Latin phrase “exempli gratia,” may be used to introduce or specify a general example or examples of a previously mentioned item, and is not intended to be limiting of such item. The common abbreviation “i.e.,”, which derives from the Latin phrase “id est,” may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as “circuitry,” “a module” or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

PLMN Public Land Mobile Network
AAA Authentication, Authorization, Accounting
AES Advanced Encryption Standard
CIA Confidentiality, Integrity, Availability
CSP Communications service provider
DSA Digital signature standard
ECDSA Elliptic curve digital signature algorithm
NF Network Function
NE Network Entity
OSS Operations Support System
RSA Rivest-Shamir-Adleman public-key cryptosystem
SHA Secure Hash Algorithms
S-SLA Security Service Level Agreement
SSOF Security Orchestration Function
TDES Triple Data Encryption Algorithm

The invention claimed is:

1. A method implemented by a security service orchestration function, SSOF, in a communication infrastructure, that includes a plurality of communication service providers, CSPs, for orchestration of a security service level agreement, S-SLA, the method comprising:

exchanging, by the SSOF, information on security capabilities between a first CSP of the plurality of CSPs and each of the other CSPs of the plurality of CSPs;

receiving a S-SLA request, by the first CSP, from the one or more other CSPs, each of the one or more other CSPs being capable of providing security services to the first CSP based on the other CSPs' own respective security capabilities, wherein each S-SLA request comprises a plurality of requirements;

converting each S-SLA request into a consistent and unified S-SLA offerable to each of the one or more other CSPs, wherein the consistent and unified S-SLA comprises security attributes that the first CSP provides the other CSPs;

offering the consistent and unified S-SLA to each of the one or more other CSPs that submitted the S-SLA request; and receiving a response from each of the one or more other CSPs, wherein the response from each of the one or more other CSPs comprises an acknowledgement or a decline of the consistent and unified S-SLA including a non-repudiation signature of acknowledgement or declining.

2. The method of claim 1, further comprising exchanging information security attributes and associated attribute value ranges between the plurality of CSPs that each CSP provides the other CSPs.

3. The method of claim 1, wherein receiving the S-SLA request comprises receiving a S-SLA request to support specific business services with specified security attributes.

4. The method of claim 1, further comprising negotiating a set of appropriate security attributes and levels that the first CSP provides each of the one or more other CSPs.

5. The method of claim 1, wherein the S-SLA request from each other CSP comprises a plurality of optional information elements or objects and a mandatory information element or object, wherein the plurality of optional information elements or objects comprises, confidentiality attributes, target integrity attributes, target authentication attributes, target availability attributes, target non-repudiation attributes, target isolation attributes, target data sovereignty attributes, validity condition, temporal validity conditions, subscription of S-SLA compliance monitoring events, allowed internet protocol, IP, domains, and extra data protection controls, and wherein the mandatory information element or object comprise a target CSP identifier.

6. The method of claim 1, further comprising:

transforming each S-SLA request into security policies and controls to be enforced within an infrastructure of the first CSP; and/or monitoring of compliance with the consistent and unified S-SLA of each of the one or more other CSPs that acknowledged or accepted the consistent and unified S-SLA.

7. The method of claim 1, wherein the SSOF interacts with supporting security management functions to perform a set of functions comprising:

sending S-SLA information and security attribute information associated with each of the plurality of CSPs to the supporting security management functions;

receiving S-SLA compliance status reports per CSP on requested intervals and on demand in response to a request from any of the plurality of CSPs; and receiving S-SLA compliance violation reports per CSP in real-time.

8. The method of claim 7, wherein the supporting security management functions comprise:

receiving, from the SSOF, security requirement and security attribute information for fulfilling the S-SLA of each of the one or more other CSPs and mapping the security requirement and security attribute information into security policies and security controls for enforcement within the communication infrastructure and network entities of the first CSP;

supporting security management activities related to safeguarding of network functions, NF, and network elements, NE;

monitoring S-SLA status of NF and NE according to set security attributes for each of the plurality of CSPs;

calculating compliance status in real-time per CSP for the S-SLA of each CSP and notifying compliance scores and compliance violations to the security service orchestration function; and maintaining historical information for S-SLA compliance per CSP.

9. The method of claim 1, wherein the SSOF comprises a northbound interface reference point configured to interface with each other CSP for negotiating the S-SLA with each other CSP and for exchanging information on S-SLA security attributes.

10. A computing device comprised in a first communication service provider, CSP, of a plurality of CSPs, in a communication infrastructure comprising a security service orchestration function, SSOF, the computing device comprising:

processing circuitry; and memory coupled with the processing circuitry, wherein the memory includes instructions that when executed by the processing circuitry causes the computing device to, exchange, via the SSOF, information on security capabilities between a first CSP and one or more other CSPs of the plurality of CSPs;

receive a S-SLA request, by the first CSP, from the one or more other CSPs, each of the one or more other CSPs being capable of providing security services to the first CSP based on the other CSPs' own respective security capabilities, wherein each S-SLA request comprises a plurality of requirements;

convert each S-SLA request into a consistent and unified S-SLA offerable to each of the one or more other CSPs, wherein the consistent and unified S-SLA comprises security attributes that the first CSP provides to the other CSPs;

offer the consistent and unified S-SLA to each of the one or more other CSPs that submitted the S-SLA request; and receive a response from each of the one or more other CSPs, wherein the response from each of the one or more other CSPs comprises an acknowledgement or a decline of the consistent and unified S-SLA including a non-repudiation signature of acknowledgement or declining.

11. The computing device of claim 10, wherein the memory includes instructions that when executed by the processing circuitry causes the computing device to exchange information security attributes and associated attribute value ranges between the plurality of CSPs that each CSP provides the other CSPs.

12. A method implemented by a security service orchestration function, SSOF, in a communication infrastructure, that includes a plurality of communication service providers, CSPs, for orchestration of a security service level agreement, S-SLA, the method comprising:

exchanging, by the SSOF, information on security capabilities between a first CSP of the plurality of CSPs and one or more other CSPs of the plurality of CSPs;

transmitting a S-SLA request, by the first CSP of the plurality of CSPs, to the one or more other CSPs, each of the one or more other CSPs being capable of providing security services to the first CSP based on the other CSPs' own respective security capabilities, wherein the S-SLA request comprises security attributes and associated levels to support specific business services with specific security attributes;

receiving a response from each of the one or more other CSPs comprising a unique S-SLA based on the S-SLA request, the unique S-SLA from each of the one or more other CSPs comprising security attributes the other CSP provides; and merging the security attributes received from each of the one or more other CSPs into a common security baseline template S-SLA that is a synthesis of capabilities offered by the one or more other CSPs for communication to business services users of the first CSP.

13. The method of claim 12, further comprising:

exchanging information security attributes and associated attribute value ranges between the plurality of CSPs that each CSP provides the other CSPs; and/or negotiating a set of appropriate security attributes and associated levels that each of the one or more other CSPs provides the first CSP.

14. The method of claim 12, wherein the S-SLA request comprises a plurality of optional information elements or objects and a mandatory information element or object, wherein the plurality of optional information elements or objects comprises, confidentiality attributes, target integrity attributes, target authentication attributes, target availability attributes, target non-repudiation attributes, target isolation attributes, target data sovereignty attributes, validity condition, temporal validity conditions, subscription of S-SLA compliance monitoring events, allowed internet protocol, IP, domains, and extra data protection controls, and wherein the mandatory information element or object comprise a target CSP identifier.

15. The method of claim 12, further comprising:

monitoring, by the first CSP, that the one or more other CSPs are in compliance with the common security baseline template S-SLA; and/or monitoring, by the first CSP, a service specific capability on demand or at service specific intervals.

16. The method of claim 12, wherein the SSOF interacts with supporting security management functions to perform a set of functions comprising:

sending S-SLA information and security attribute information associated with each of the plurality of CSPs to the supporting security management functions;

receiving S-SLA compliance status reports per CSP on requested intervals and on demand in response to a request from any of the plurality of CSPs; and receiving S-SLA compliance violation reports per CSP in real-time.

17. The method of claim 16, wherein the supporting security management functions comprise:

receiving, from the SSOF, security requirement and security attribute information for fulfilling the S-SLA of each of the one or more other CSPs and mapping the security requirement and security attribute information into security policies and security controls for enforcement within the communication infrastructure and network entities of the first CSP;

supporting security management activities related to safeguarding of network functions, NF, and network elements, NE;

monitoring S-SLA status of NF and NE according to set security attributes for each of the plurality of CSPs;

calculating compliance status in real-time per CSP for the S-SLA of each CSP and notifying compliance scores and compliance violations to the security service orchestration function; and maintaining historical information for S-SLA compliance per CSP.

18. The method of claim 12, wherein the SSOF comprises a northbound interface reference point configured to interface with each other CSP for negotiating the S-SLA with each other CSP and for exchanging information on S-SLA security attributes.

19. A computing device comprised in a first communication service provider, CSP, of a plurality of CSPs in a communication infrastructure comprising a security service orchestration function, SSOF, the computing device comprising:

processing circuitry; and memory coupled with the processing circuitry, wherein the memory includes instructions that when executed by the processing circuitry causes the computing device to, exchange, via the SSOF, information on security capabilities between the first CSP and one or more other CSPs of the plurality of CSPs;

transmit a S-SLA request, by the first CSP, to the one or more other CSPs, each of the one or more other CSPs being capable of providing security services to the first CSP based on the other CSPs' own respective security capabilities, wherein the S-SLA request comprises security attributes and associated levels to support specific business services with specific security attributes;

receive a response from each of the one or more other CSPs comprising a unique S-SLA based on the S-SLA request, the unique S-SLA from each of the one or more other CSPs comprising security attributes the other CSP provides; and merge the security attributes received from each of the one or more other CSPs into a common security baseline template S-SLA that is a synthesis of capabilities offered by the one or more other CSPs for communication to business services users of the first CSP.

20. The computing device of claim 19, wherein the memory includes instructions that when executed by the processing circuitry causes the computing device to exchange information security attributes and associated attribute value ranges between the plurality of CSPs that each CSP provides the other CSPs.

* * * * *